United States Patent
Rillie et al.

(10) Patent No.: US 11,585,093 B2
(45) Date of Patent: *Feb. 21, 2023

(54) SKYLIGHT DIMMER

(71) Applicant: Solatube International, Inc., Vista, CA (US)

(72) Inventors: David Rillie, Vista, CA (US); Joseph Prenn, San Diego, CA (US); Kalen Eidenschink, Carlsbad, CA (US)

(73) Assignee: Solatube International, Inc., Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/509,762

(22) Filed: Oct. 25, 2021

(65) Prior Publication Data

US 2022/0042314 A1 Feb. 10, 2022

Related U.S. Application Data

(63) Continuation of application No. 16/281,829, filed on Feb. 21, 2019, now Pat. No. 11,168,480.

(51) Int. Cl.
*E04D 13/00* (2006.01)
*E04D 13/03* (2006.01)
(Continued)

(52) U.S. Cl.
CPC ....... *E04D 13/033* (2013.01); *E04D 13/0354* (2013.01); *E05F 15/611* (2015.01); *E05F 15/70* (2015.01); *H02J 7/35* (2013.01); *E04D 2013/0345* (2013.01); *E05Y 2201/434* (2013.01); *E05Y 2201/638* (2013.01); *E05Y 2201/71* (2013.01); *E05Y 2400/32* (2013.01); *E05Y 2400/612* (2013.01);
(Continued)

(58) Field of Classification Search
CPC ........ E05F 15/70; E05F 15/611; H05B 47/11; E04D 13/033; E04D 13/0354; E04D 2013/034; E04D 2013/0345; F21S 11/007; F21S 19/005; F21S 11/00; H02J 7/35; H02J 7/345; E05Y 2400/32; E05Y 2400/612; E05Y 2400/628; E05Y 2900/13; E05Y 2900/146; E05Y 2900/154; E05Y 2201/434; E05Y 2201/71; E05Y 2201/638; E05Y 2800/106; Y02B 10/10; Y02B 20/40
USPC .......... 49/25; 52/200, 28; 250/205; 359/592, 359/591, 596; 160/7; 315/151, 155, 154, 315/158; 362/147
See application file for complete search history.

(56) References Cited

U.S. PATENT DOCUMENTS 3,070,345 A 12/1962 Ludwig
3,488,505 A 1/1970 Jentoft et al.
(Continued)

FOREIGN PATENT DOCUMENTS

GB 2463635 A 3/2010
JP 2003064831 A 3/2003

*Primary Examiner* — Chi Q Nguyen
(74) *Attorney, Agent, or Firm* — John L. Rogitz

(57) ABSTRACT

A dimmer mechanism is movable by a motor that is powered by solar-charged supercapacitors between a first configuration, in which the dimmer mechanism blocks little of the interior of a skylight tube to maximize light throughput into a room, and a second configuration, in which the dimmer mechanism blocks more of the interior of a skylight tube to reduce light throughput into the room.

11 Claims, 11 Drawing Sheets

(51) Int. Cl.
  *H02J 7/35* (2006.01)
  *E05F 15/70* (2015.01)
  *E05F 15/611* (2015.01)
  *E04D 13/035* (2006.01)
  *H02J 7/34* (2006.01)
(52) U.S. Cl.
  CPC ..... *E05Y 2400/628* (2013.01); *E05Y 2900/13* (2013.01); *H02J 7/345* (2013.01)

(56) References Cited

U.S. PATENT DOCUMENTS

| | | |
|---|---|---|
| 4,072,404 A | 2/1978 | Brown |
| 4,126,379 A | 11/1978 | Wu |
| 4,372,485 A | 2/1983 | McCabe |
| 4,427,048 A | 1/1984 | Osaka et al. |
| 4,505,069 A | 3/1985 | Freeman |
| 4,517,765 A | 5/1985 | Mucha |
| 4,538,218 A | 8/1985 | Watson |
| 4,628,954 A | 12/1986 | Dayus |
| 5,076,316 A * | 12/1991 | Brown .................. F16K 1/223 137/315.16 |
| 5,099,622 A | 3/1992 | Sutton |
| 5,493,824 A | 2/1996 | Webster et al. |
| 5,546,712 A | 8/1996 | Bixby |
| 5,675,487 A | 10/1997 | Patterson et al. |
| 5,742,103 A | 4/1998 | Ashok |
| 6,108,226 A | 8/2000 | Ghosh et al. |
| 6,130,781 A | 10/2000 | Gauvin |
| 6,142,645 A * | 11/2000 | Han ................ E04D 13/0325 362/147 |
| 6,219,977 B1 | 4/2001 | Chao et al. |
| 6,256,947 B1 | 7/2001 | Grubb |
| 6,528,782 B1 | 3/2003 | Zhang et al. |
| 6,827,445 B2 * | 12/2004 | Abe ........................ F24S 50/20 353/3 |
| 6,918,216 B2 | 7/2005 | Hoy et al. |
| 6,947,296 B2 | 9/2005 | Hirosawa |
| 7,082,726 B2 | 8/2006 | Prenn et al. |
| 7,339,739 B1 * | 3/2008 | Kinney .............. G02B 19/0042 359/597 |
| 7,683,301 B2 | 3/2010 | Papamichael et al. |
| 8,068,282 B1 | 11/2011 | Kastner et al. |
| 8,111,460 B1 | 2/2012 | Huang |
| 8,456,729 B2 | 6/2013 | Brown et al. |
| 8,536,505 B2 * | 9/2013 | Page ....................... H05B 47/11 250/206 |
| 8,639,382 B1 | 1/2014 | Clark et al. |
| 9,520,825 B2 | 12/2016 | Cheung |
| 9,897,289 B2 | 2/2018 | Biron et al. |
| 10,017,985 B2 | 7/2018 | Lundy et al. |
| 10,145,525 B2 | 12/2018 | Shannin et al. |
| 10,533,892 B2 | 1/2020 | Brown et al. |
| 11,168,480 B2 * | 11/2021 | Rillie ..................... F21S 11/007 |
| 11,332,939 B2 * | 5/2022 | Visitsak ................. E04D 13/033 |
| 2005/0005542 A1 | 1/2005 | Prenn et al. |
| 2007/0215788 A1 * | 9/2007 | Nishihara ............ G03B 27/521 250/205 |
| 2007/0297058 A1 | 12/2007 | Briee et al. |
| 2008/0310147 A1 * | 12/2008 | Blomberg ............. F21S 19/005 362/147 |
| 2011/0067824 A1 | 3/2011 | Konstantin et al. |
| 2011/0073161 A1 | 3/2011 | Scanlon |
| 2012/0227729 A1 | 9/2012 | Lundahl et al. |
| 2015/0354223 A1 | 12/2015 | Biron et al. |
| 2018/0106443 A1 | 4/2018 | Shannin et al. |
| 2019/0203475 A1 * | 7/2019 | Burkes ............... G02B 27/0955 |

* cited by examiner

SKYLIGHT DIMMER

FIELD

The present application relates generally to skylight dimmers.

BACKGROUND

Skylights conserve energy by illuminating interior spaces in buildings using natural sunlight. As understood herein, skylights are so effective at interior illumination that people may want to dim the light entering the room through a skylight.

SUMMARY

An assembly includes at least one light conveying structure having an upper end configured to be covered by a transparent cover and a lower end configured to distribute light. The light conveying structure is configured to guide sunlight entering the transparent cover through the lower end into a room. A dimmer mechanism may be configured within the transparent cover or within the light conveying structure. At least one motor is coupled to at least one supercapacitor to energize the motor. Also, at least one photovoltaic (PV) cell or other power supply is coupled to the supercapacitor to charge the supercapacitor. At least one wireless receiver is configured to receive commands from at least one remote control (RC) configured for communicating the commands to the wireless receiver to activate the motor to move the dimmer mechanism between a first configuration, in which the dimmer mechanism blocks a first amount of a cross-sectional area of the light conveying structure, and a second configuration, in which the dimmer mechanism blocks a second amount of the cross-sectional area of the light conveying structure, with the first amount being different from the second amount.

In example embodiments, plural supercapacitors are coupled to the motor. In some examples, the dimmer mechanism includes at least one movable plate. Indeed, an example dimmer mechanism may include at least first and second semi-circular plates (valve elements) pivotable on respective first and second axles coupled to a cam. Also, at least one switch can be coupled to the cam to cause the motor to stop turning responsive to a cam position being reached. In some examples the plates (valve elements) are not connected to each other.

Example implementations may include at least one controller configured to receive commands from the RC. The controller can be configured to maintain the dimmer mechanism in a closed configuration responsive to a voltage indicating low or no sunlight. The controller also can be configured to deenergize the wireless receiver responsive to a voltage indicating low or no sunlight. In non-limiting examples, the controller is configured to, responsive to detecting an initial charge of the supercapacitor using a battery or power supply, enter an installation mode in which the wireless receiver is maintained energized regardless of whether the voltage indicates low or no sunlight.

In some implementations the RC includes a single-button control element (i.e., one and only one manipulable key) and the assembly may include at least one switch operatively associated with the motor to cause the motor to stop turning regardless of which single-button control element remains actuated to transmit the commands responsive to a first angular position being reached. In such embodiments, the controller may be configured to delay activating the motor responsive to the dimmer mechanism being fully open or fully closed before reversing the motor.

In another aspect, an assembly includes at least one light conveying structure, at least one movable dimmer mechanism in the light conveying structure, and at least one motor coupled to the dimmer mechanism to move the dimmer mechanism. At least one supercapacitor is configured to energize the motor, while at least one photovoltaic (PV) cell or other power supply is configured to charge the supercapacitor.

In another aspect, a method includes receiving a signal, and responsive to the signal, supplying power to a motor from at least one supercapacitor. The motor is coupled to at least one dimmer mechanism to move the dimmer mechanism to alter throughput of light through a light conveyance assembly. The method also includes charging at least one supercapacitor using at least one photovoltaic (PV) cell or other power supply configured to charge the supercapacitor.

The details of the present application, both as to its structure and operation, can best be understood in reference to the accompanying drawings, in which like reference numerals refer to like parts, and in which:

DETAILED DESCRIPTION

Figure 1:
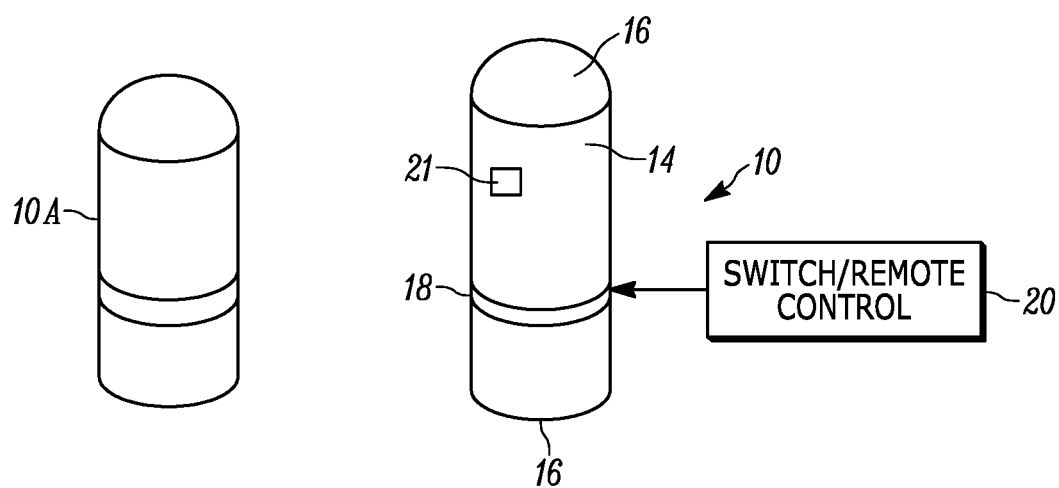
FIG. 1 is a perspective view of two skylights consistent with present principles and a remote control, omitting the PV panel and control box for clarity and showing the switch/remote control schematically.

Referring initially to FIG. 1, a skylight 10 is shown that includes a light conveying structure 14 having an open upper end covered by a transparent preferably roof-mounted cover 16 and an open lower end that may be covered by a preferably ceiling-mounted diffuser plate 16A. The light conveying structure 14, although sometimes referred to herein as a "tube", may have a circular cross-section or a cross-section of other shape, e.g., ovular, triangular, rectangular, pentagonal, or other shape.

The light conveying structure 14 may include at least two segments as shown, with a hollow shroud 18 holding a dimmer mechanism being sandwiched between two segments to selectively block light from propagating through the skylight 10. When the skylight has a circular cross-section the shroud 18 is cylindrical. As an alternative to placing the shroud 18 between the segments, it may be positioned on either end of the light conveying structure 14. Particularly but not exclusively when it is positioned at the top end (i.e., just below the dome 16), the dimmer mechanism discussed below can be coated with reflective material to function as reflectors when in the open configuration, to increase the amount of light directed into the skylight 10. The shroud 18 may be integral with the segments of the light conveying structure.

As set forth further below, the dimmer mechanism within the shroud 18 may be activated to open and close. To this end, an actuating device 20 such as a wall-mounted cable connected switch or in the embodiment shown a wireless hand-held user command signal generator that uses, e.g., rf or IR signal transmission communicates with components within the skylight. When a motorized system is used, the actuating device 20A may automatically and incrementally move the valve throughout the day as appropriate to adjust the amount of light being passed through the skylight 10 to establish a constant illumination effect over the course of the day. The movement can be based on a clock or on signals from a light sensor 21. In some embodiments the light sensor is established by one or more of the below-described photovoltaic (PV) cells.

A second skylight 10A that in all essential respects is identical in configuration and operation to the skylight 10 described above may be provided in the same building, for example.

Figure 2:
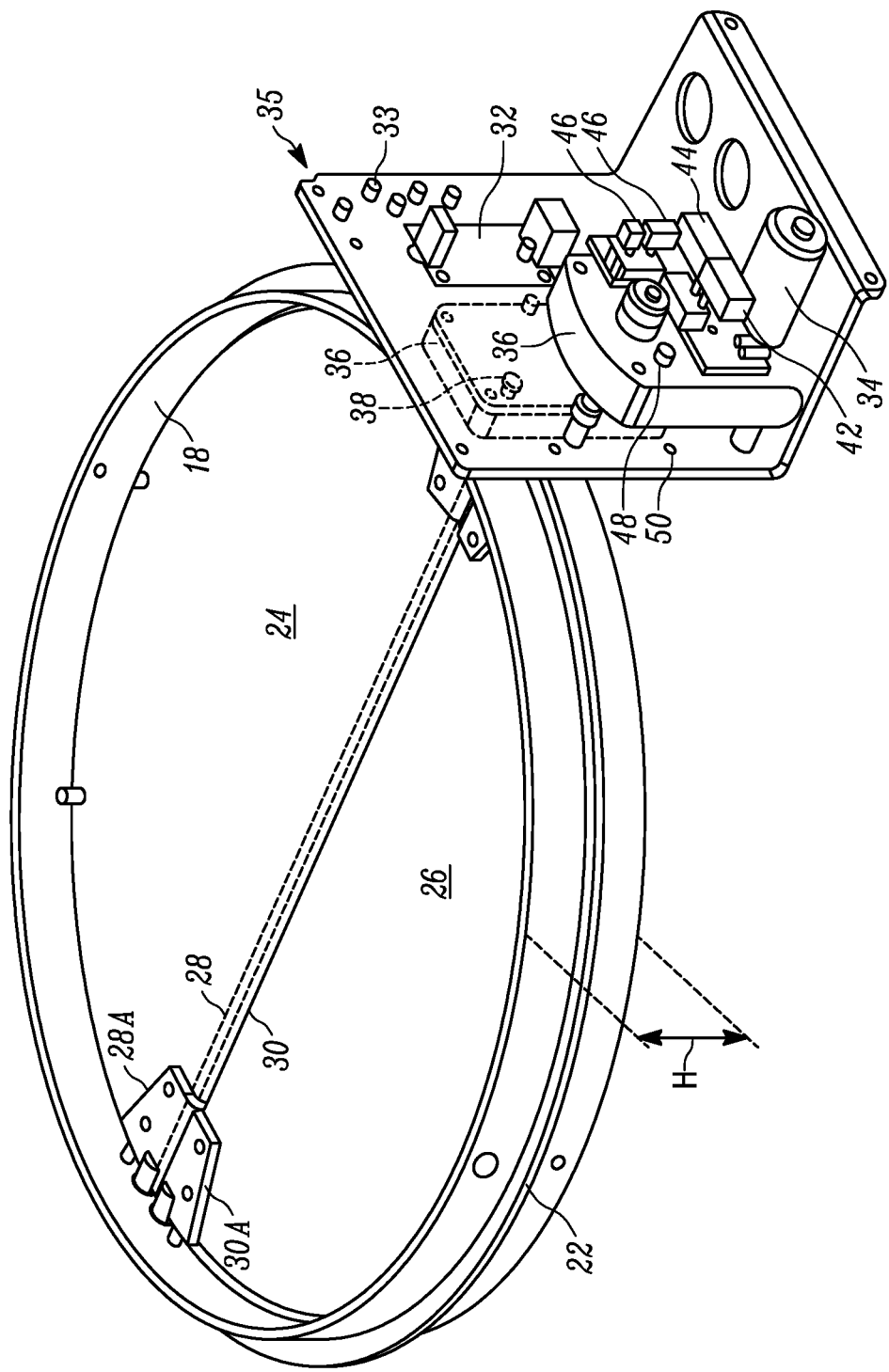
FIG. 2 is a perspective view of an example dimmer mechanism in a first configuration in which substantially the entire cross-sectional area of the tube is blocked, with the control box cover removed to expose portions of an example non-limiting control box, showing portions in phantom.
Figure 3:
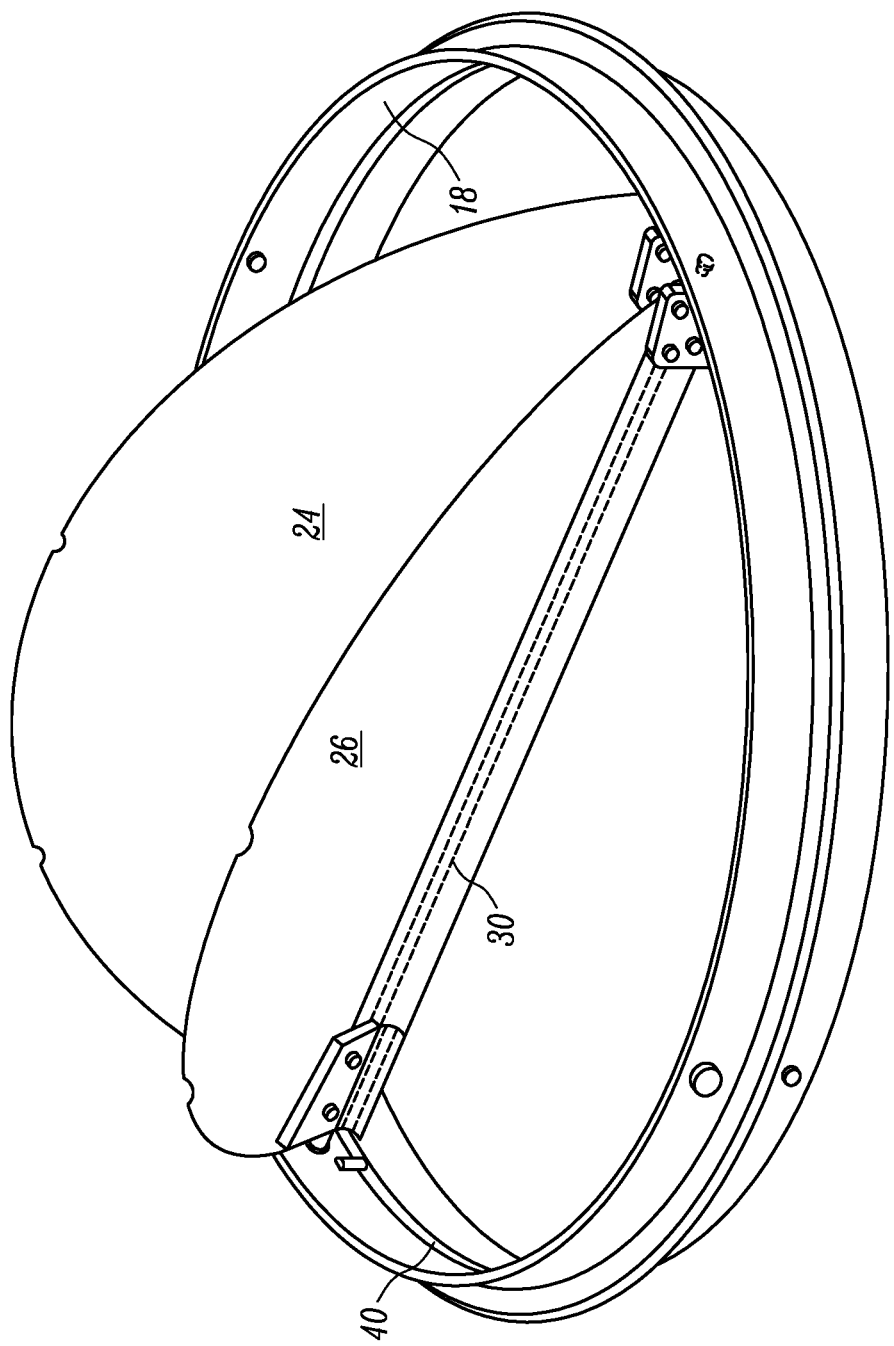
FIG. 3 is a perspective view of the mechanism in FIG. 2 in a second configuration in which the cross-sectional area of the tube is substantially not blocked, with the control box cover removed for illustration, showing portions in phantom.

Now referring to FIGS. 2 and 3, the shroud 18 may be formed with an outer circumferential flange 22 against which the lower edge of the upper tube segment and upper edge of the lower tube segment of the tube structure 14 abut. Also, pivotably disposed within the shroud 18 are first and second semicircular plates (valve elements) 24, 26, which rotate about respective axles 28, 30 between the closed configuration shown in FIG. 2, wherein light passage through the shroud 18 (and, hence, skylight 10) is substantially blocked, and the open configuration shown in FIG. 3, wherein light may pass through the shroud 18. It can be appreciated in cross-reference to FIGS. 2 and 3 that the valve elements 24, 26 rotate through no more than ninety degrees (90°). It can also be noted that the plates (valve elements) 24, 26 shown in FIGS. 2 and 3 are not connected to each other. Each axle 28, 30 is held at opposite ends to a respective clip 28A, 30A that is fastened to a respective plate 24, 26, e.g., by fasteners, or adhesive, or soldering, or other means. In other examples, the clips 28A, 30A may be joined together in the manner of a door hinge with interlocking loops that form a channel through which a pin extends. Instead of a single long axle, each plate may have two opposed short axles extending only part way across the plate (i.e., only part way across the diameter of the skylight tube).

To move the axles 28, 30 (and, hence, the valve elements 24, 26), in response to user command signal from the actuating device 20, one or more (in the example shown, five) supercapacitors 33 on a control box 35 (control box cover removed in FIG. 2) are charged by one or more photovoltaic (PV) cells shown in subsequent drawings and described further below to drive a DC motor 34. As understood herein, supercapacitors advantageously last longer than batteries in typically hot attics, and typically can be recharged faster than batteries, while posing less fire risk.

The DC motor 34 in turn may be coupled to a reduction gear train housed in a gear train housing assembly 36, with the reduction gears reducing the speed of rotation of the motor 34 to an operating speed of a gear train shaft. The gear train shaft in the preferred embodiment is coupled with a cam 38 that preferably rotates through one hundred eighty degrees (180°). Both axles 28, 30 may ride on the cam 38. The cam 38 may be configured such that as it rotates through 180°, each axle 28, 30 rotates through 90°.

Alternatively, a linkage can be provided between the cam 38 and axles 28, 30. The linkage may include a sliding element that provides linear translation of the rotation of the cam. The sliding element can be coupled to a lever that in turn is coupled to the axles to turn the axles and in effect transform translational motion of the linkage back into rotational motion of the axles.

In the embodiment shown, since the plates (valve elements) 24, 26 are semicircular, they each define a diameter, with the height "H" of the shroud being substantially smaller than the diameter as shown, resulting in a lower profile and less clearance problems during installation. If desired, as best shown in FIG. 3 the shroud 18 may be formed with a lip 40 that circumscribes the inner surface of the shroud, with the plates (valve elements) 24, 26 resting on the lip 40 when in the closed configuration to better seal the light passageway and prevent light leakage. When the light conveying structure 14 is rectangular in transverse cross-section, the valve elements can be rectangular to match the contour of the light conveying structure and would have a "width" defined by the dimension of their respective edges which are perpendicular to the axes about which they rotate.

Returning to FIG. 2, the control box 35 may support additional components discussed further below, including a controller or microprocessor 42 accessing a program storage device 44, a wireless receiver or transceiver 46, a night mode selector switch 48, and a pairing button 50. The program storage device 44 may be disk-based or solid-state storage or other appropriate computer storage medium. Note that the layout of the control box 35 is but a non-limiting example, and that an alternate layout is described further below in respect of certain control box components.

Figure 4:
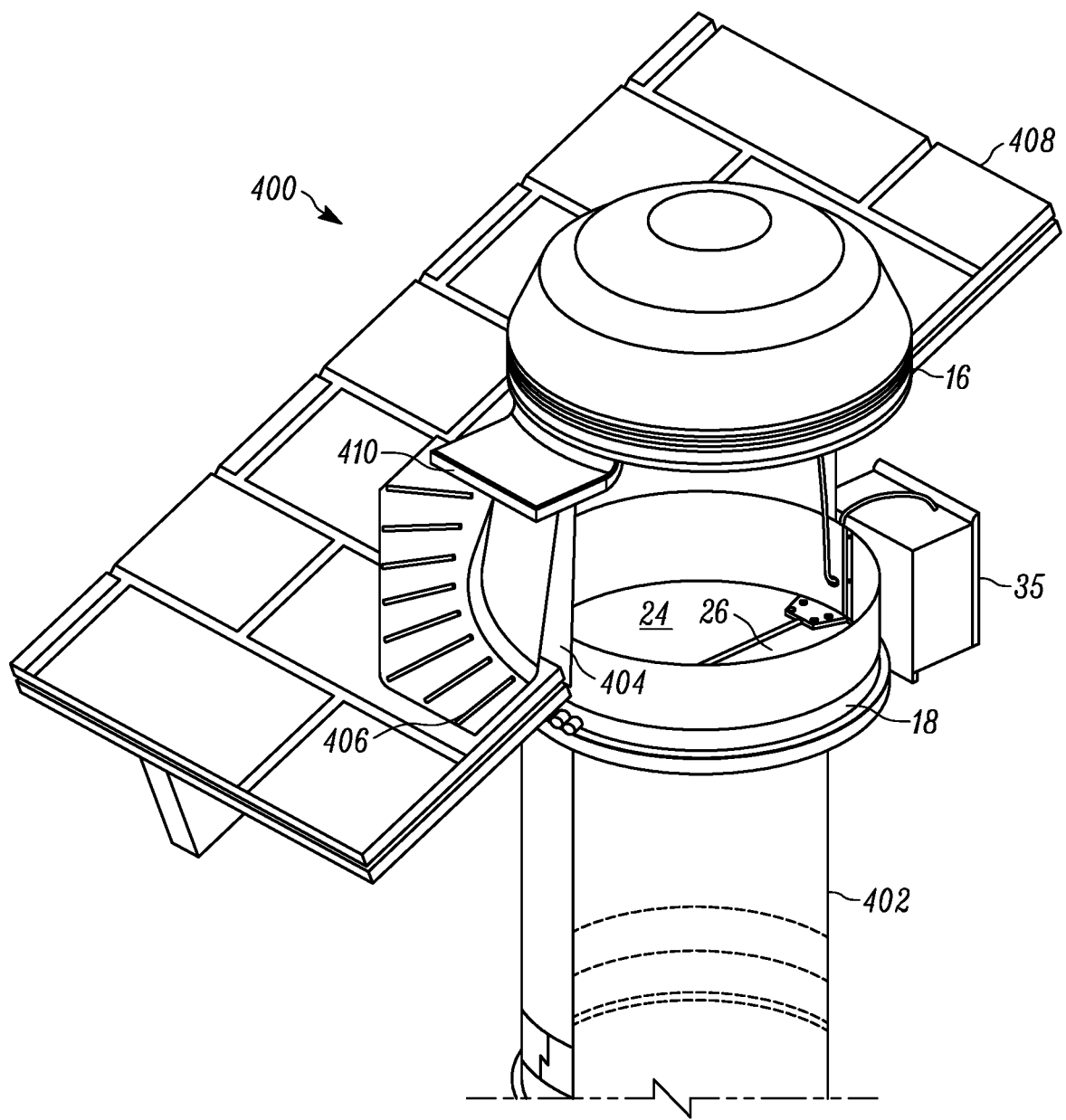
FIG. 4 is a perspective view of the upper portion of the skylight showing the PV panel and control box, with portions of the flashing, roof, and skylight tube removed for illustration.

FIG. 4 shows the shroud 18 engaged with a light conveying assembly 400. The assembly 400 may include one or more internally reflective skylight tubes 402 above which a hollow roof flashing 404 is attached to mount a skirt 406 of the flashing 402 to a roof 408. The skylight cover 16 covers the top end of the assembly 400 as shown. The control box 35 may be attached to the exterior of the assembly 400, e.g., using one or more brackets or bands.

Figure 4A:
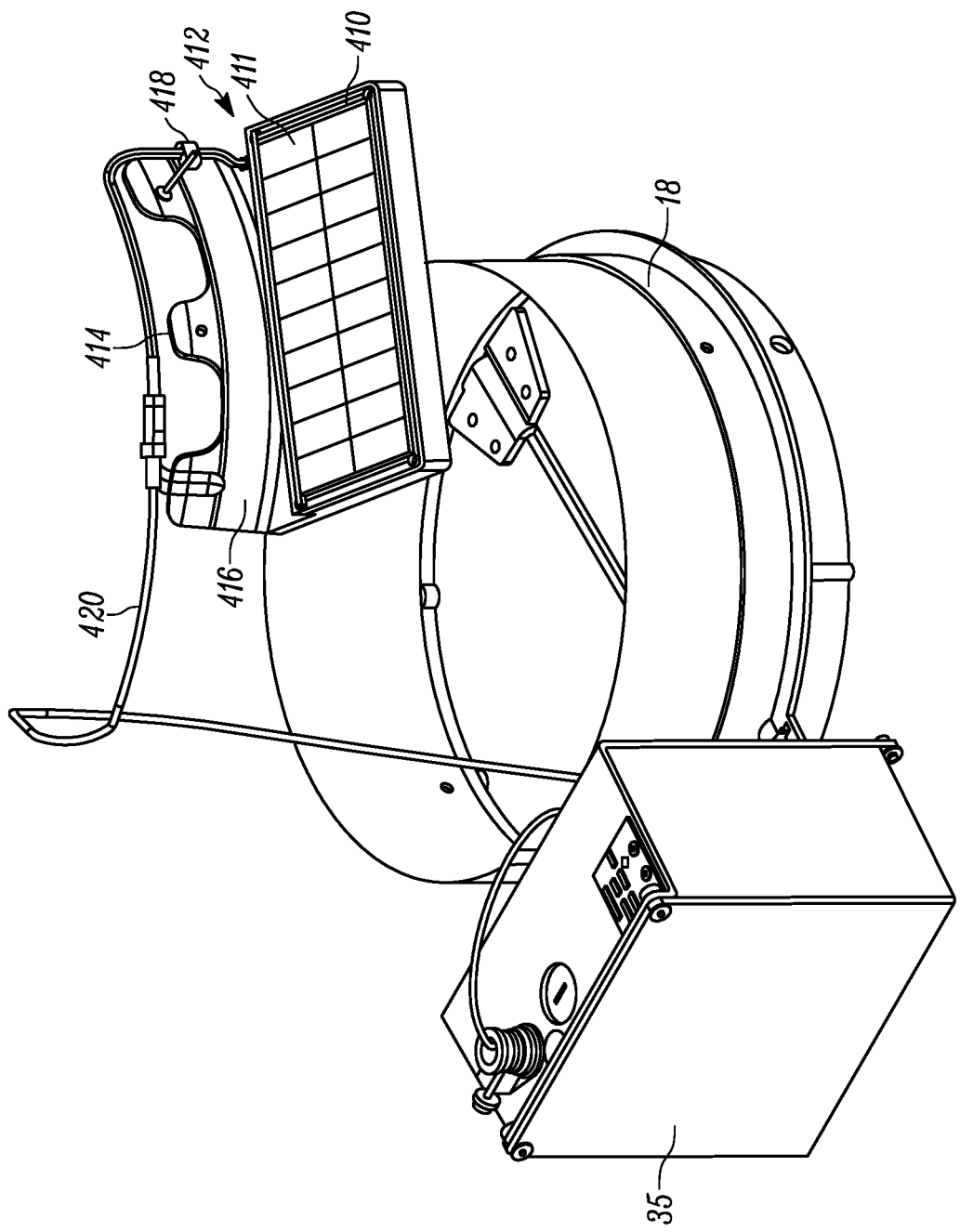
FIG. 4A is an exploded perspective view of a portion of the assembly showing a first technique for mounting the PV panel to the assembly, with the dome and other portions of the assembly not shown.

As shown in FIG. 4, a PV panel 410 comprising plural PV cells is attached to the exterior of the assembly and in the example shown is attached to the exterior of the flashing 404, exposed to sunlight during the day. The PV panel 410 in the example shown is oriented generally horizontally, it being understood that the PV panel may be tilted as appropriate for the latitude of the installation to directly face the sun at, for example, the equinox, or one of the solstices. Alternatively, the PV Panel may track the sun in order to directly face the sun at all times when the sun is above the horizon. FIG. 4A illustrates an example implementation in which the PV panel 410 with plural PV cells 411 is mounted to the light conveyance assembly, and in the example contemplated to the flashing. A bracket assembly 412 is coupled to the PV panel 410. The bracket assembly 412 may include plural brackets 414 extending upwardly from a bracket strip 416, with the brackets 414 and strip 416 being slightly curved in the circumferential dimension as shown to form arcs of a cylinder to mate with the exterior cylindrical surface of the flashing 404 or other cylindrical portion of the light conveyance assembly.

In the example shown, it will be appreciated that no part of the bracket assembly 412 extends over the top edge of the flashing into the light conveying passageway. Instead, each bracket 414 is held against the exterior surface of the flashing 404 by one or more fasteners 418, which may be set screws that abut the exterior surface of the flashing or which may be sheet metal screws or other types of fasteners that extend through the flashing but that are not secured on the inner part of the light conveying passageway by nuts or similar complementary fasteners. If desired, however, nuts may be used to secure each screw 418. One or more wires 420 can connect the PV panel 410 to the appropriate components of the control box 35.

Figure 5:
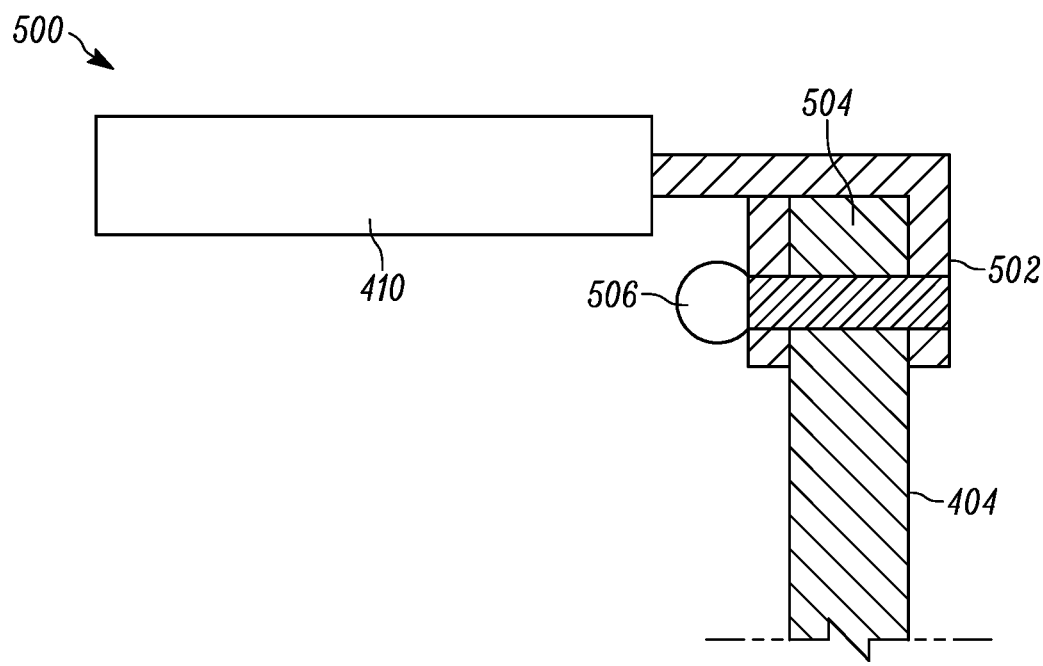
FIG. 5 is a partial cross-sectional diagram showing a second example technique for mounting the PV panel to the assembly (in the example shown, to the flashing), with the dome and other portions of the assembly not shown.
Figure 6:
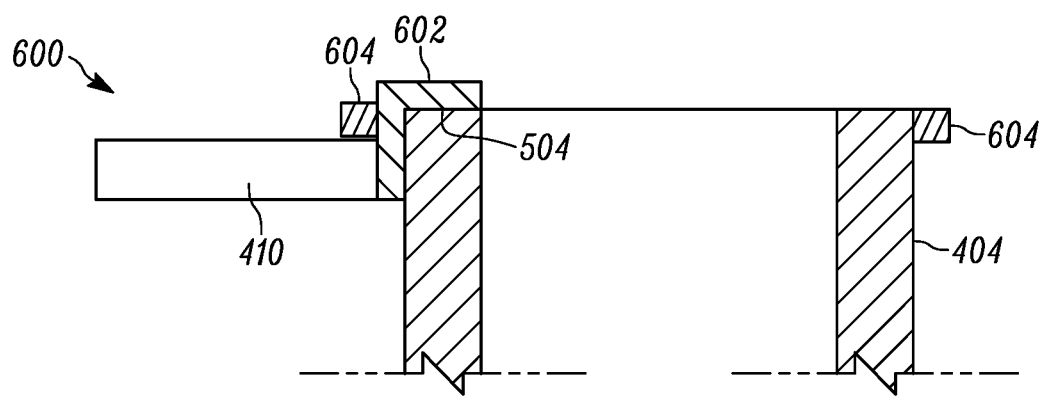
FIG. 6 is a partial cross-sectional diagram showing a third example technique for mounting the PV panel to the assembly.

FIGS. 5 and 6 illustrate alternate example techniques for attaching the PV panel 410 to the flashing 404. In FIG. 5, one or more brackets 500 are attached to the PV panel, e.g., by fasteners or adhesive or other appropriate means. In an example, three brackets are used. Each bracket may have one or two legs 502. When one leg is used it is positioned flush against the exterior of the flashing. When two legs are used in the non-limiting embodiment shown, the legs of a bracket straddle the top edge 504 of the flashing 404. One or more fasteners 506 may extend through holes in the legs 502 that are registered with an opening through the flashing 404 to securely hold the PV panel onto the exterior of the assembly 400, outside of the interior light-conveying space.

FIG. 6 illustrates another alternative technique in which a bracket 600 that may be L-shaped as shown is attached to the PV panel 410, with an optional horizontal segment 602 of the bracket 600 resting on the top edge 504 of the flashing 404 but not extending down into the interior of the assembly 400. This supports the PV panel in the vertical dimension. A fastening mechanism such as a duct clamp 604 with worm drive fastener can circumscribe the bracket 600 and flashing 404 to hold the PV panel against the exterior of the assembly.

Figure 7:
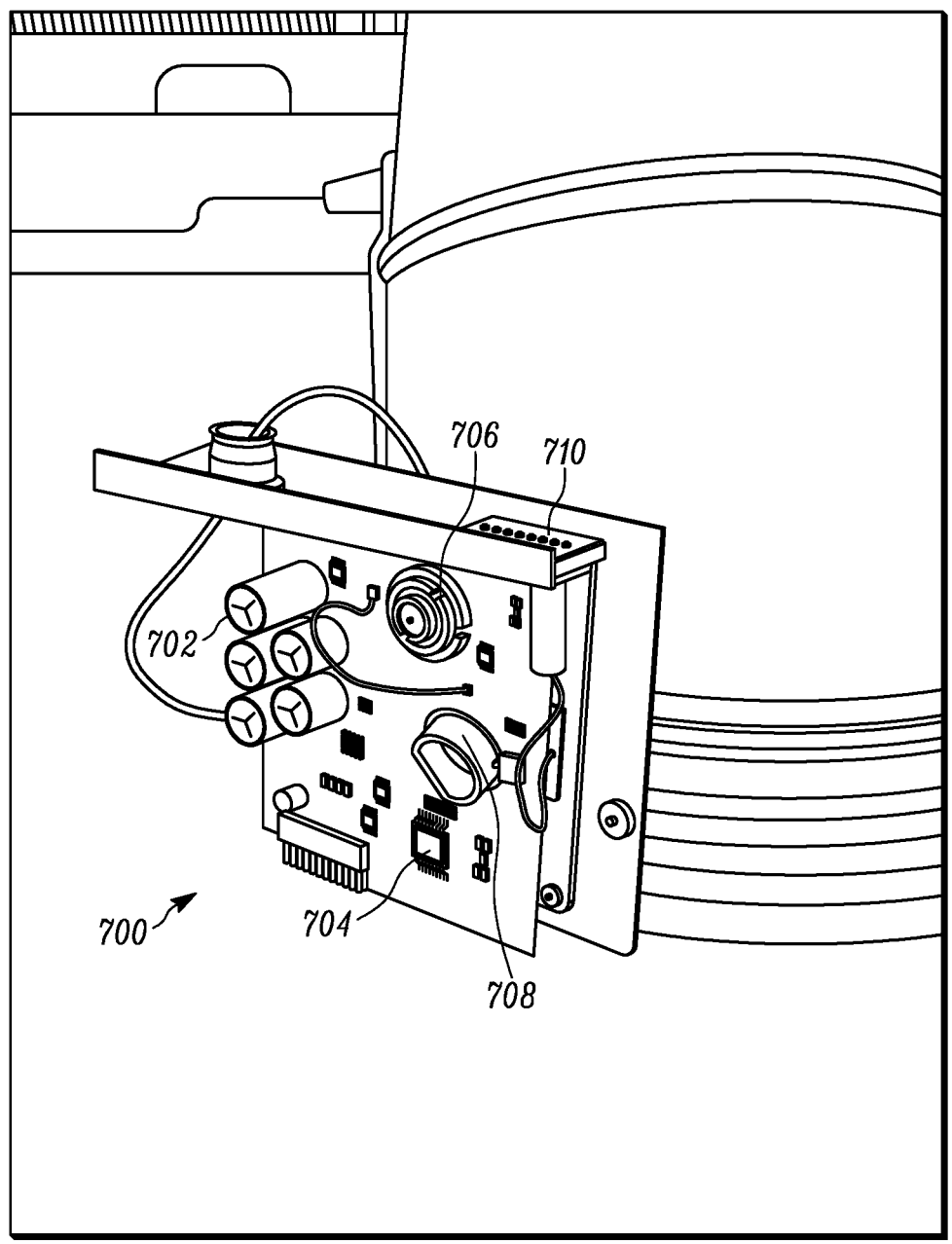
FIG. 7 is a perspective view of an example control box with the cover removed.
Figure 8:
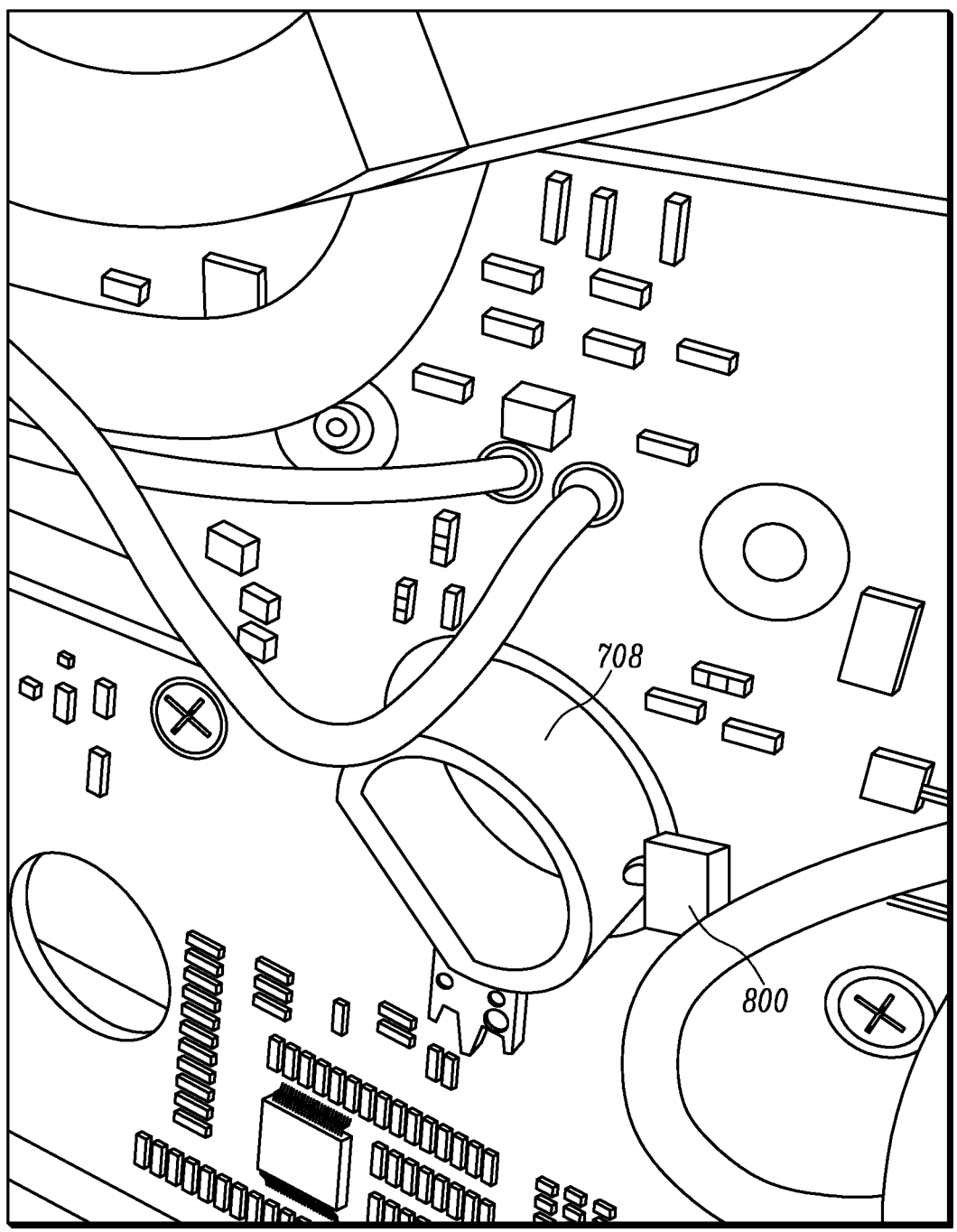
FIG. 8 is a close-up perspective view of the control box showing the cam and limit switch.
Figure 9:
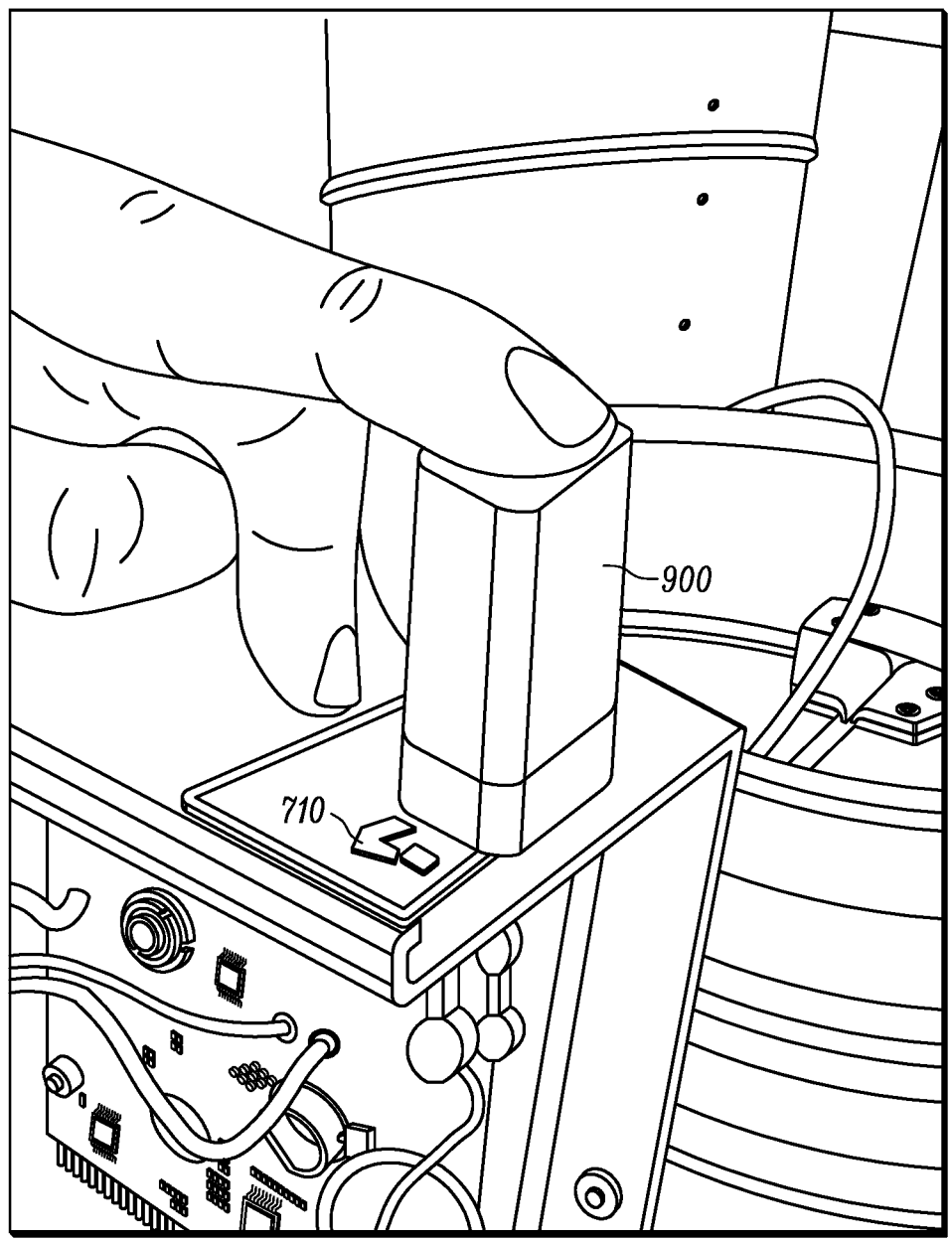
FIG. 9 is a close-up perspective view of the control box showing engagement of a battery or power supply for an initial charge of the supercapacitors.

FIGS. 7-9 illustrate example non-limiting features of a control box 700 that may include some or all of the components shown in FIG. 2 and described above. In FIGS. 7-9, one or more supercapacitors 702 (five shown) can be mounted on a circuit board along with a controller 704 such as a microprocessor or digital signal processor (DSP) or other appropriate processor to control operation of a motor 706. The supercapacitors 702 are electrically connected to the PV panel 410 to receive solar-generated electricity therefrom to charge the supercapacitors post-installation.

The motor 706 can be coupled to a cam mechanism 708 with a periphery having a straight segment as shown. The cam mechanism 708 in turn is coupled, e.g., via reduction gears, to the axles 28, 30 shown in FIG. 2 to move the plates (valve elements) 24, 26 between the closed and open configurations shown in FIGS. 2 and 3. A battery receptacle 710 may be provided on the control box 700 and electrically connected to the supercapacitors 702 to initially charge the supercapacitors 702 as more fully disclosed below. After initial charge, the battery or power supply typically is removed, and the apparatus thereafter operates as a battery-less system.

FIG. 8 illustrates that one or more limit switches 800 are mechanically engaged with the cam 708 to generate signals indicating the attainment of limit positions (fully open and fully closed) of the plates (valve elements) 24, 26. FIG. 9 illustrates an example initial charge battery or power supply 900 plugged into the battery receptacle 710 to initially charge the supercapacitors usually during installation of the assembly.

Figure 10:
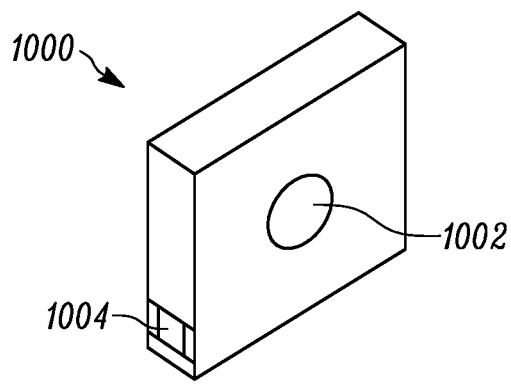
FIG. 10 is a perspective view of an example one-button remote control.

With the above combinations of structure in mind, attention is drawn to FIGS. 10-13 to illustrate example principles of operation of the supercapacitor-based dimmer assemblies described above. FIG. 10 illustrates that a one-button remote control (RC) 1000 may include only a single manipulable key 1002 which when pressed causes a wireless signal to be transmitted by a transceiver 1004, shown schematically in FIG. 10. The signal is received by a receiver in the dimmer assembly, e.g., the receiver 46 shown in FIG. 2. However, in other embodiments multiple keys on the remote control may be linked to multiple functions on the microprocessor 42 shown on FIG. 2 may be provided on the RC.

Figure 11:
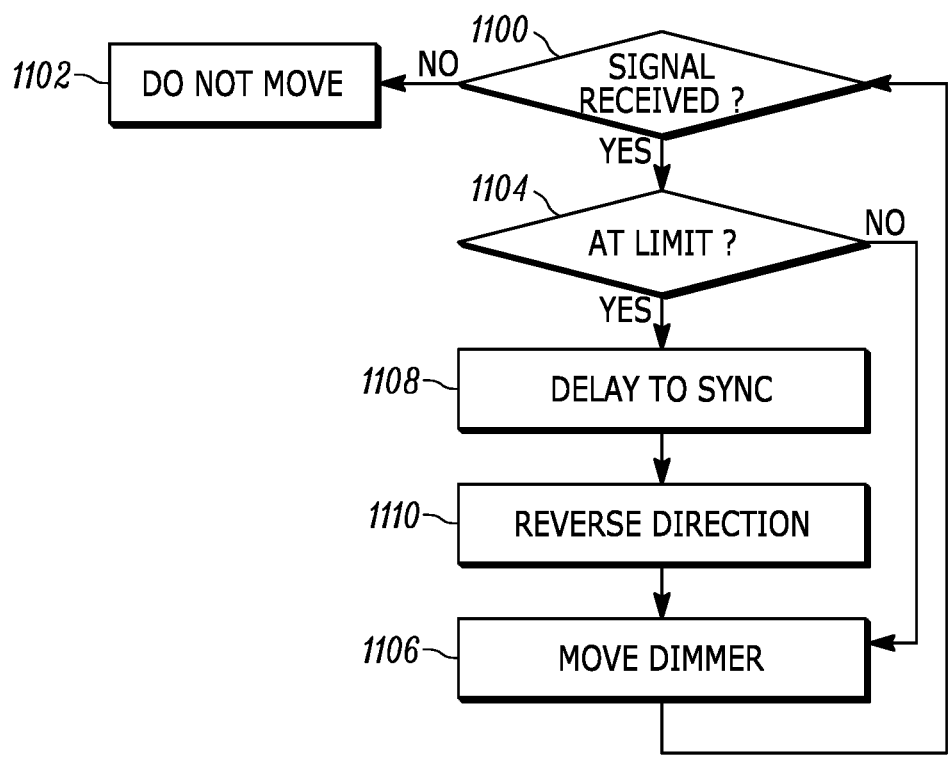
FIG. 11 is a flow chart of example operating logic consistent with present principles.

FIG. 11 illustrates logic that the dimmer assembly controller may perform. FIG. 11 indicates at state 1100 that if a signal is received from the RC 1000 and sent from the receiver 46 to the assembly controller such as the processor shown in FIG. 2 or FIG. 7, the processor logic moves to state 1104, but otherwise (no signal) the logic ends at state 1102 to not move the motor and, hence, the dimmer plates (valve elements).

At state 1104 it may be determined, based on signals from the limit switch 800 shown in FIG. 8 and described above, whether the plates (valve elements) are at a limit (fully open or fully closed). If not, the dimmer plates (valve elements) are moved at state 1106 by energizing the assembly motor, e.g., the motor 706 shown in FIG. 7. This is accomplished by completing an electrical path via a switch or other appropriate component between the motor and the supercapacitors.

However, if it is determined at state 1104 for example via signal from a limit switch that the dimmer plates (valve elements) are fully opened or fully closed, as the signal from the RC is continuously received the controller delays, e.g., for a few seconds, prior to moving to state 1110. This is to allow synchronization of multiple assemblies 10, 10A (FIG. 1) that may be installed in a common area and that may be controlled in concert with one another using a single RC, since such multiple assembles typically operate in different states of supercapacitor charge and, hence, at different voltages and thus different motor speeds. After the delay period and while the signal from the RC is being received, the logic moves to state 1110 to reverse the direction of motor rotation and then energize the motor to move the plates (valve elements) at state 1106. As long as the RC signal is received, the plates (valve elements) are moved until a limit position is again sensed, causing the delay and motor reversal once again as described above.

Figure 12:
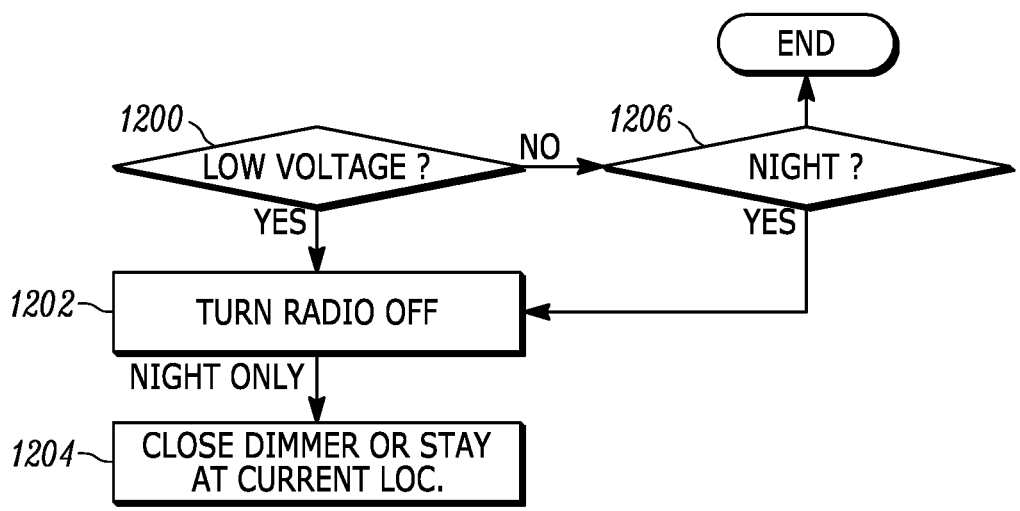
FIG. 12 is a flow chart of example special situation logic consistent with present principles.

FIG. 12 illustrates additional logic that may be advantageously undertaken by the dimmer assembly controller. If low voltage of the supercapacitors is detected at state 1200, the radio (i.e., the wireless receiver) may be deenergized at block 1202. Voltage detection may be done by the controller monitoring the voltage output of the supercapacitors, moving to state 1202 when the voltage drops below a threshold. Also, if night mode is detected at state 1206 as indicated by, e.g., a low output current from the PV cells described herein, in addition to deenergizing the radio at state 1202, the dimmer mechanism either may be either closed (night mode 1) or held at whatever position between open and closed it happens to be when night falls (night mode 2). The night mode can be established during installation by appropriately manipulating the night mode selector switch 48 shown in FIG. 2.

Figure 13:
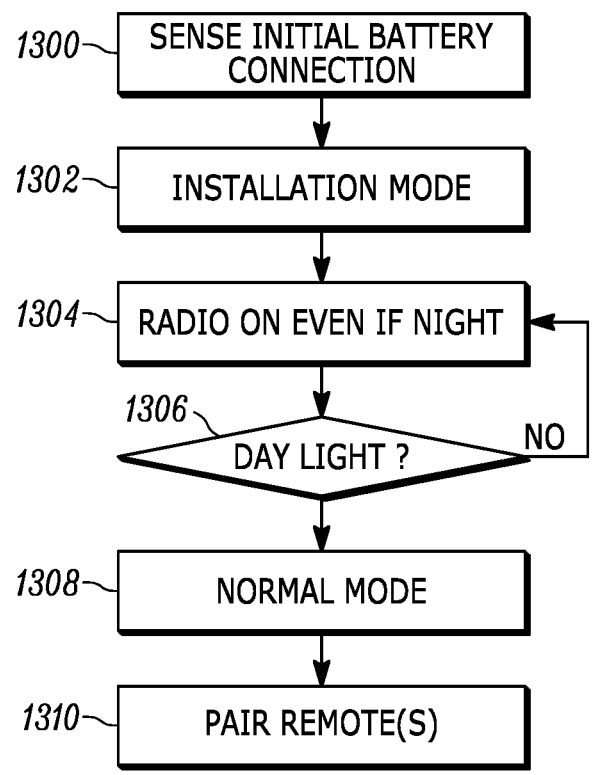
FIG. 13 is a flow chart of example initial battery or power supply charge logic consistent with present principles.

FIG. 13 illustrates logic that may be executed during installation when the supercapacitors are initially charged by the battery or power supply 900 shown in FIG. 9 being plugged into the battery receptacle 710. The controller senses a voltage from the receptacle 710 (or otherwise senses battery or power supply engagement such as indicated by a mechanical switch) at state 1300. Moving to state 1302, the controller enters an installation mode, in which it proceeds to state 1304 to ensure the radio (wireless receiver) is energized to receive control signals as may be initiated by the installation technician regardless of whether night mode is indicated, e.g., by a low current output from the PV cells. This is necessary because as understood herein, the PV cells may still be in the box during part of the installation or not connected to the control box during part of the installation. However, once daylight is sensed by the controller at state 1306, it can enter the normal operating mode described above in reference to FIGS. 11 and 12 at state 1308.

FIG. 13 also indicates that at state 1310, one or more RCs (such as the RC 1000 in FIG. 10) can be paired with the controller so that the controller responds to the paired RCs. Typically, the assembly is shipped with one RC already paired. Additional RCs can be paired by manipulating the pairing button 50 shown in FIG. 2 while holding down the RC key, signaling to the controller that signals having the characteristics of the RC being paired should be responded to. All units may also have a master remote from the manufacturer that is pre-paired to communicate with any dimmer mechanism.

Note that the RF section of the receiver including, e.g., the wireless receiver or transceiver 46 may be cycled on and off periodically to conserve energy.

Note further that in an embodiment, in addition to or in lieu of the RC, a cable may connect a wall-mounted manipulable switch to the control elements in the control box to control position of the dimmer. Thus, the assembly may include at least one controller or relay configured to receive commands, and at least one remote switch mechanism configured for communicating the commands to the dimmer controller via hard wires.

While the particular device is herein shown and described in detail, it is to be understood that the subject matter which is encompassed by the present invention is limited only by the claims.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

What is claimed is:

1. An assembly, comprising:
   at least one light conveying structure having an upper end configured to be covered by a transparent cover and a lower end, the light conveying structure being configured to guide sunlight entering the transparent cover through the lower end into a room;
   a dimmer mechanism in the light conveying structure;
   at least one motor;
   at least one power supply coupled to the motor to energize the motor;
   at least one wireless receiver configured to receive commands from at least one remote control (RC); and
   at least one controller configured to receive commands from the RC and:
   activate the motor to move the dimmer mechanism; and
   maintain the dimmer mechanism in a closed configuration responsive to at least one light sensor providing output indicating low or no sunlight.

2. The assembly of claim 1, wherein the power supply comprises at least one supercapacitor.

3. The assembly of claim 1, comprising at least one photovoltaic (PV) cell coupled to the power supply to charge the power supply.

4. The assembly of claim 1, wherein the dimmer mechanism comprises at least one valve element.

5. The assembly of claim 1, wherein the dimmer mechanism comprises at least first and second semi-circular valve elements pivotable on respective first and second axles, the first and second axles both being coupled to a cam, at least one switch being coupled to the cam to cause the motor to stop turning responsive to a cam position being reached, the valve elements not being connected to each other.

6. The assembly of claim 1, wherein the at least one controller is configured to deenergize the wireless receiver responsive to a voltage from the light sensor indicating low or no sunlight.

7. The assembly of claim 1, wherein the controller is configured to, responsive to detecting an initial charge of the power supply using a battery or power supply, enter an installation mode in which the wireless receiver is maintained energized regardless of whether the voltage indicates low or no sunlight.

8. An assembly, comprising:
   at least one light conveying structure having an upper end configured to be covered by a transparent cover and a lower end, the light conveying structure being configured to guide sunlight entering the transparent cover through the lower end into a room;
   a dimmer mechanism in the light conveying structure;
   at least one motor;
   at least one wireless receiver configured to receive commands from at least one remote control (RC) to activate the motor to move the dimmer mechanism,
   wherein the RC comprises a single-button control element for activating the motor in both directions and the assembly comprises:
   at least one switch operatively associated with the motor to cause the motor to stop turning regardless of whether the single-button control element remains actuated to transmit the commands responsive to a first angular position being reached.

9. The assembly of claim 8, comprising:
at least one power supply coupled to the motor to energize the motor; and
at least one photovoltaic (PV) cell coupled to the power supply to charge the power supply.

10. An assembly, comprising:
at least one light conveying structure having an upper end configured to be covered by a transparent cover and a lower end, the light conveying structure being configured to guide sunlight entering the transparent cover through the lower end into a room;
a dimmer mechanism in the light conveying structure;
at least one motor;
at least one wireless receiver configured to receive commands from at least one remote control (RC); and
at least one controller configured to:
activate the motor to move the dimmer mechanism; and
delay activating the motor responsive to the dimmer mechanism being fully open or fully closed before reversing the motor.

11. The assembly of claim 10, comprising:
at least one power supply coupled to the motor to energize the motor;
at least one photovoltaic (PV) cell coupled to the power supply to charge the power supply.

* * * * *